(No Model.)

M. G. CRANE.
MILLING CUTTER BLANK.

No. 258,560. Patented May 30, 1882.

Witnesses
John F. C. Preinkert
L. F. Connor.

Inventor:
Moses G. Crane
by Crosby & Gregory
Atty's.

UNITED STATES PATENT OFFICE.

MOSES G. CRANE, OF NEWTON, MASSACHUSETTS.

MILLING CUTTER-BLANK.

SPECIFICATION forming part of Letters Patent No. 258,560, dated May 30, 1882.

Application filed December 12, 1881. (No model.)

*To all whom it may concern:*

Be it known that I, MOSES G. CRANE, of Newton, county of Middlesex, State of Massachusetts, have invented an Improvement in Cutter-Blanks and Method of Making the Same, of which the following description, in connection with the accompanying drawings, is a specification.

My invention relating to a cutter-blank is shown embodied in a blank for a burr-cutter for making the teeth of gear-wheels, and has for its object to simplify and cheapen the construction thereof. In making blanks for this purpose the periphery of the disk constituting the blank is turned in a lathe to give it the sectional shape desired for the cutting-faces of the teeth subsequently formed thereon. The turning-tool is properly controlled to give the periphery of the cutter at the same time a scalloped shape, so that when the teeth are subsequently formed by notching the said periphery the cutting-faces which come at the line separating the different scallops will have their cutting-edges which lie in the circumference of the blank somewhat beveled, or will have what is termed " clearance." This scalloping has been accomplished by moving the cutter radially toward and from the center of the blank as it revolves. By this method the cutting-edges of the teeth which lie at the circumferences of the blank or at the ends of the teeth are properly beveled; but the cutting-edges which extend inward from the said circumferential edge toward the center of the blank, or which lie at the sides of the teeth, are not so beveled, and the teeth of the cutter formed in this way will consequently bind when working in some kinds of material. Heretofore this objection has been obviated by grinding the said cutting portion at the side of each tooth to give it the proper bevel or clearance, the operation requiring great skill on the part of the workman, and being at best a very slow process. This I obviate in my present invention by producing what may be termed a "lateral scalloping" or "concaving," in connection with the usual or radial scalloping at the periphery of the cutter, and the method by which I produce this radially and laterally scalloped blank consists in the employment of a cutting-tool which acts upon the edge and one side of the blank, and giving the said tool a reciprocating movement toward and from the blank in a direction inclined to its plane, instead of parallel with the said plane, as heretofore practiced.

Figure 1:
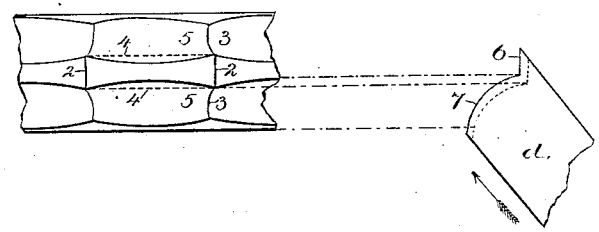
Figure 2:
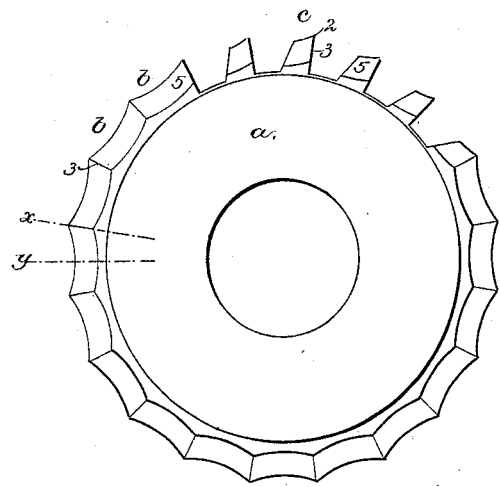
Figure 3:
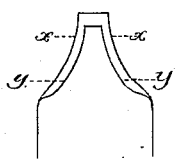

Figure 1 is an edge view of a portion of a cutter-blank constructed in accordance with this invention, and also showing the tool in its extreme position occupied in making the said blank. Fig. 2 is a face view of the blank, a portion of its teeth being formed by notching its edge in the usual manner; and Fig. 3, sections on line $x$ and $y$, Fig. 2, enlarged.

Referring to Fig. 2, it will be seen that the cutter blank or disk $a$ is scalloped or provided with a series of inwardly-curved portions, $b$, at its periphery, the bounding-line 3 between such portions lying in the plane which is to form the cutting-faces of the teeth $c$, which are subsequently formed by notching or removing a portion of the cutter at each scallop. This gives the cutting-edge 2 at the end of the finished tooth which lies in the circumference of the cutter the proper bevel, and as viewed in Fig. 2 the cutter-blank does not appear different from those which have heretofore been made. In all cutter-blanks, however, that have previously been made, so far as I am aware, the lines connecting the circumferential cutting-edges 2 would be, when viewed as in Fig. 1, parallel straight lines, such as indicated by dotted lines 4, and consequently the cutting-edges 3 at the sides of the teeth would have no clearance. In other words, sections taken on any plane passing through the axis of the cutter, as on $x$ or $y$, Fig. 2, would have the same shape and dimensions at the periphery of the cutter, some, however, being nearer the center than the others; but by producing what may be termed "lateral fluting" or "concaving" of the blank the said lines connecting the cutting-edges 2 are curved inward, and the cutting-edges 3 are thus also caused to be beveled, as well as the edges 2—a thing which has hitherto been accomplished only by grinding the rear portion, 5, of each tooth by hand. This lateral concaving shown in Fig. 1 is accomplished simultaneously with the radial scalloping shown in Fig. 2 by employing a cutting-tool, $d$, Fig. 1, having a cutting-edge, 6, which acts upon the circumference of the cutter, and a cutting-edge, 7, which acts on the side thereof, the former corresponding with the cutting-edge 2 at the end of and the latter with the cutting-edge 3 at the sides of the teeth of the complete cutter, and giving the said tool d a proper reciprocating movement in the direction of the arrow—that is, oblique to the plane of the cutter-blank a as it is revolved, so that at the same time that the edge 6 approaches the axis of rotation of the blank a to form the radial scalloping shown in Fig. 2, the cutting-edge 7 will enter more deeply into the sides of the said blank to form the lateral concavities shown in Fig. 1.

It is obvious that burrs or toothed cutters for any purposes besides forming gear-teeth may be constructed on this plan, the cutter formed from such a blank having all its cutting-edges properly beveled, and that consequently the operations of beveling the lateral edges of the cutting-faces by hand subsequent to the formation of the tooth is rendered unnecessary, the cutter having all its edges properly beveled being made just as quickly and with as little expense as the cutters which have only their circumferential edges beveled.

I claim—

The herein-described cutter-blank, having its periphery provided with a series of concavities sunk laterally or in a direction parallel with its axis of rotation, whereby the side edges of the teeth subsequently formed therein by notching are properly beveled, substantially as described.

In testimony whereof I have signed my name to this specification in the presence of two subscribing witnesses.

MOSES G. CRANE.

Witnesses:
JOS. P. LIVERMORE,
BERNICE J. NOYES.